United States Patent
Kalman

(10) Patent No.: US 8,340,407 B2
(45) Date of Patent: Dec. 25, 2012

(54) SYSTEM AND METHOD FOR IMAGE DEMOSAICING

(75) Inventor: Mark Kalman, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 1017 days.

(21) Appl. No.: 12/353,539

(22) Filed: Jan. 14, 2009

(65) Prior Publication Data
US 2010/0177961 A1 Jul. 15, 2010

(51) Int. Cl.
*G06K 9/00* (2006.01)
(52) U.S. Cl. ......................................................... 382/162
(58) Field of Classification Search .......... 382/162–167, 382/260, 266; 358/525; 348/252, 272
See application file for complete search history.

(56) References Cited

U.S. PATENT DOCUMENTS

| | | | |
|---|---|---|---|
| 7,053,944 B1* | 5/2006 | Acharya et al. | 348/273 |
| 7,301,573 B2* | 11/2007 | Park et al. | 348/252 |
| 7,835,573 B2* | 11/2010 | Kang et al. | 382/167 |
| 8,160,380 B2* | 4/2012 | Das Gupta et al. | 382/260 |
| 8,165,389 B2* | 4/2012 | Malvar | 382/162 |
| 8,165,394 B2* | 4/2012 | Cai et al. | 382/166 |

OTHER PUBLICATIONS

Hirakawa et al. "Adaptive Homogeneity-Directed Demosaicing Algorithm," IEEE Transactions on Image Processing, vol. 14, No. 3, Mar. 2005.

* cited by examiner

*Primary Examiner* — Jose Couso
(74) *Attorney, Agent, or Firm* — Patterson & Sheridan, LLP

(57) ABSTRACT

A method for generating an interpolated output image, including generating a first interpolation array including RGB values, at least one of which is interpolated, based on a first interpolation region, and generating a first homogeneity array based on the first interpolation array including homogeneity values calculated based on a first homogeneity neighborhood having the same pixel locations as the first interpolation region. The method includes generating a second interpolation array based on a second interpolation region, and generating a second homogeneity array based on the second interpolation array and a second homogeneity neighborhood, where the second homogeneity neighborhood includes the same pixel locations as the second interpolation region. The method includes determining, for a first pixel location, that the homogeneity value in the first homogeneity array is greater than the homogeneity value in the second homogeneity array, and outputting the RGB color values in the first interpolation array.

45 Claims, 8 Drawing Sheets

Interpolation Regions

Homogeneity Neighborhoods

SYSTEM AND METHOD FOR IMAGE DEMOSAICING

BACKGROUND OF THE INVENTION

1. Field of the Invention

The invention relates generally to image processing and, more specifically, to a system and method for image demosaicing.

2. Description of the Related Art

Digital camera technology has developed rapidly over the past decade. A broad variety of digital cameras are now available to meet the diverse needs of a wide spectrum of consumers. Digital camera technology provides a user with a convenient device to capture image data and to transfer the captured image data to a medium. The medium may be a computer-readable medium, such as a Digital Video Disc (DVD) or a computer memory, or the medium may be a physical medium, such as photographic paper.

In a typical digital camera, a lens projects an image onto a digital sensor that is divided into a grid of pixels. A captured image is a recording of how much light energy is measured at each pixel location. To record color information, a red color filter, a green color filter, or a blue color filter is placed over each pixel of the digital sensor. Many digital sensors are limited to having only one of the three color filters placed over each pixel location. Thus, the sensor is only capable of determining a color value for one of the three red, green, and blue (RGB) colors at each pixel location. For example, if a red color filter is placed over a particular pixel, then the digital sensor measures how much energy is present in the red range of the spectrum at that particular pixel location. Color filters are typically placed over the pixels of the digital sensor in an alternating arrangement known as a Bayer pattern. FIG. 2 is a conceptual diagram that illustrates a typical Bayer pattern, according to the prior art. As shown, a sensor 202 is divided into pixels 210 arranged in a grid. A blue color filter 204, a red color filter 206, or a green color filter 206 is placed over each pixel 210. When the image is captured, only one color component is determined at each pixel location based on which color filter is placed over that pixel.

However, to display the image properly, all three color components are needed at each pixel location. The unknown color components are typically interpolated from the information that is known, i.e., from the surrounding pixels. The interpolation process is known as "demosaicing." Some conventional algorithms interpolate a missing color component in one of two ways—either horizontally or vertically. A missing color component is either inferred from pixels to the left and right (horizontal interpolation) or from pixels above and below (vertical interpolation). These conventional algorithms then choose which interpolation direction achieves the best result for a particular pixel. For example, if a pixel is located along a horizontal edge in the image, then a typical prior art algorithm would choose to interpolate the missing color component values of the pixel using horizontal interpolation since pixel colors to the left and right (i.e., along the edge) are better indications of what the missing color values should be, compared to the color values of the pixels above and below the edge.

Using some conventional demosaicing approaches, a first interpolated image is generated by interpolating each pixel using horizontal interpolation. Then, a second interpolated image is generated by interpolating each pixel using vertical interpolation. For each pixel location, a selection algorithm then chooses between the interpolated pixel value in the first interpolated image at the pixel location and the interpolated pixel value in the second interpolated image at the pixel location. In general, an implementation does not need to interpolate the entire image plane in a particular direction. Rather, a selection algorithm can determine an interpolation direction for each pixel based on a few neighbors, without the need to interpolate the entire image plane in a particular direction.

To decide which interpolation direction to select for a particular pixel location, a selection algorithm chooses one interpolation direction (either horizontal or vertical) at that particular pixel location. Common methods for interpolation direction selection are based on relative magnitudes of horizontal and vertical gradients. For example, a region of the input image may represented by the following array:

| B1 | G2 | B3 |
|----|----|----|
| G4 | R5 | G6 |
| B7 | G8 | B9, | where B1, B3, B7, and B9 indicate that the blue color value is known at those relative pixel locations, G2, G4, G6, and G8 indicate that the green color value is known at those relative pixel locations, and R5 indicates that the red color value is known at that relative pixel location. To determine the green color value G5 using gradients at position marked by R5, one prior art approach may set G5 to be G5=(G4+G6)/2 if |G4−G6|<|G2−G8|, and let G5=(G2+G8)/2 otherwise.

Other prior art approaches for interpolation direction selection are based on a concept of "homogeneity." These algorithms define an approximately circular "neighborhood" around the pixel location in question and compute a measure of how much the colors of the neighbors deviate from the color values of the pixel in question based on the interpolation direction. Some conventional algorithms define a threshold amount on a deviation scale and count how many neighbors deviate by less than the threshold amount for each interpolation direction. The number of neighbors that deviate less than the threshold amount for a particular interpolation direction defines a "homogeneity factor" at that pixel location for that interpolation direction. If more neighbors are within the threshold amount when horizontal interpolation is used, then the pixel is interpolated horizontally. Otherwise, the pixel is interpolated vertically. Thus, the algorithm chooses the interpolation direction that yields the higher homogeneity.

FIG. 3A is a conceptual diagram of interpolation regions, according to the prior art. As shown, the interpolation regions include a horizontal interpolation region 302 and a vertical interpolation region 304. Using the horizontal interpolation region 302, pixel color values are interpolated from pixel color values of pixels to the left and to the right of a pixel in question 306. Similarly, using the vertical interpolation region 304, pixel color values are interpolated from pixel color values above and below a pixel in question 308. FIG. 3B is a conceptual diagram of homogeneity neighborhoods, according to the prior art. As shown, an approximately "circular" region 312 surrounding the pixel in question 310 is used to determine the homogeneity of a particular interpolation direction at the pixel in question 310. As shown, the neighborhood may have a radius of one pixel from the pixel in question 310 (e.g., homogeneity neighborhood 314) or a radius of two pixels from the pixel in question 310 (e.g., homogeneity neighborhood 316). In some prior art approaches, the demosaicing algorithm achieves better results using a larger radius for the homogeneity neighborhood.

In most prior art approaches, interpolation directions, like the ones shown in FIG. 3A, are used to determine only the unknown green color values. Once green color values are interpolated for each pixel location, the missing red and blue color values may be found using a different approach.

One problem with conventional demosaicing approaches is that only two interpolation directions (i.e., horizontal and vertical) are used when interpolating pixel color values. Accordingly, when the image includes a diagonal edge, interpolating using horizontal or vertical interpolation results in "zippering" or "checkerboard" artifacts to be introduced into the resultant image.

A second problem with conventional demosaicing approaches that are homogeneity-based is that homogeneity noise is introduced when the interpolation region is different than the neighborhood used to determine homogeneity. As shown in FIGS. 3A and 3B, the interpolation regions are "linear," meaning that the pixels considered when interpolating color values are within the same row or column of pixels; whereas, the homogeneity neighborhoods are "circular," meaning that the pixels considered are within some radius of the pixel in question in all directions. Since at least some of the pixels in the homogeneity neighborhood do not contribute to the final color values of the pixel (i.e., at least one pixel location in the homogeneity neighborhood is not included in the interpolation region), using a substantially circular homogeneity neighborhood introduces noise into the homogeneity map. This noise may cause the conventional demosaicing algorithm to fail to choose the best interpolation direction for a particular pixel, resulting in lower image quality.

Accordingly, there remains a need in the art for an improved demosaicing technique that reduces the artifacts and noise introduced using conventional techniques.

SUMMARY OF THE INVENTION

One embodiment of the invention sets forth a computer-implemented method for generating an interpolated output image. The method includes generating a first interpolation array for a portion of an input image based on a first interpolation region, where each pixel location in the portion includes a red color value, a green color value, or a blue color value, and the first interpolation array includes, at each pixel location in the portion, red, green, and blue (RGB) color values, at least one of which is interpolated; generating a second interpolation array based on a second interpolation region and including, at each pixel location in the portion, RGB color values, at least one of which is interpolated; generating a first homogeneity array based on the first interpolation array that includes, at each pixel location in the portion, a homogeneity value calculated based on a first homogeneity neighborhood that includes the same pixel locations as the first interpolation region; generating a second homogeneity array based on the second interpolation array that includes, at each pixel location in the portion, a homogeneity value calculated based on a second homogeneity neighborhood that includes the same pixel locations as the second interpolation region; determining that, for a first pixel location in the portion, the homogeneity value in the first homogeneity array is greater than the homogeneity value in the second homogeneity array; and outputting to a display or to a memory the RGB color values at the first pixel location in the first interpolation array.

Other embodiments of the invention include computer-readable media that store instructions that can configure a processing unit to implement one or more variations of the above method as well as a system having one or more processors configured to implement one or more variations of the above method.

One advantage of the systems and methods is that better image quality is achieved when compared to using prior art techniques. Zippering artifacts are especially reduced along diagonal edges in the image. Also, since the homogeneity neighborhoods include the same pixel locations as the corresponding interpolation regions, less homogeneity noise is introduced into the interpolation direction selection process. Accordingly, better image quality is achieved by choosing the most appropriate interpolation direction for a given pixel location.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
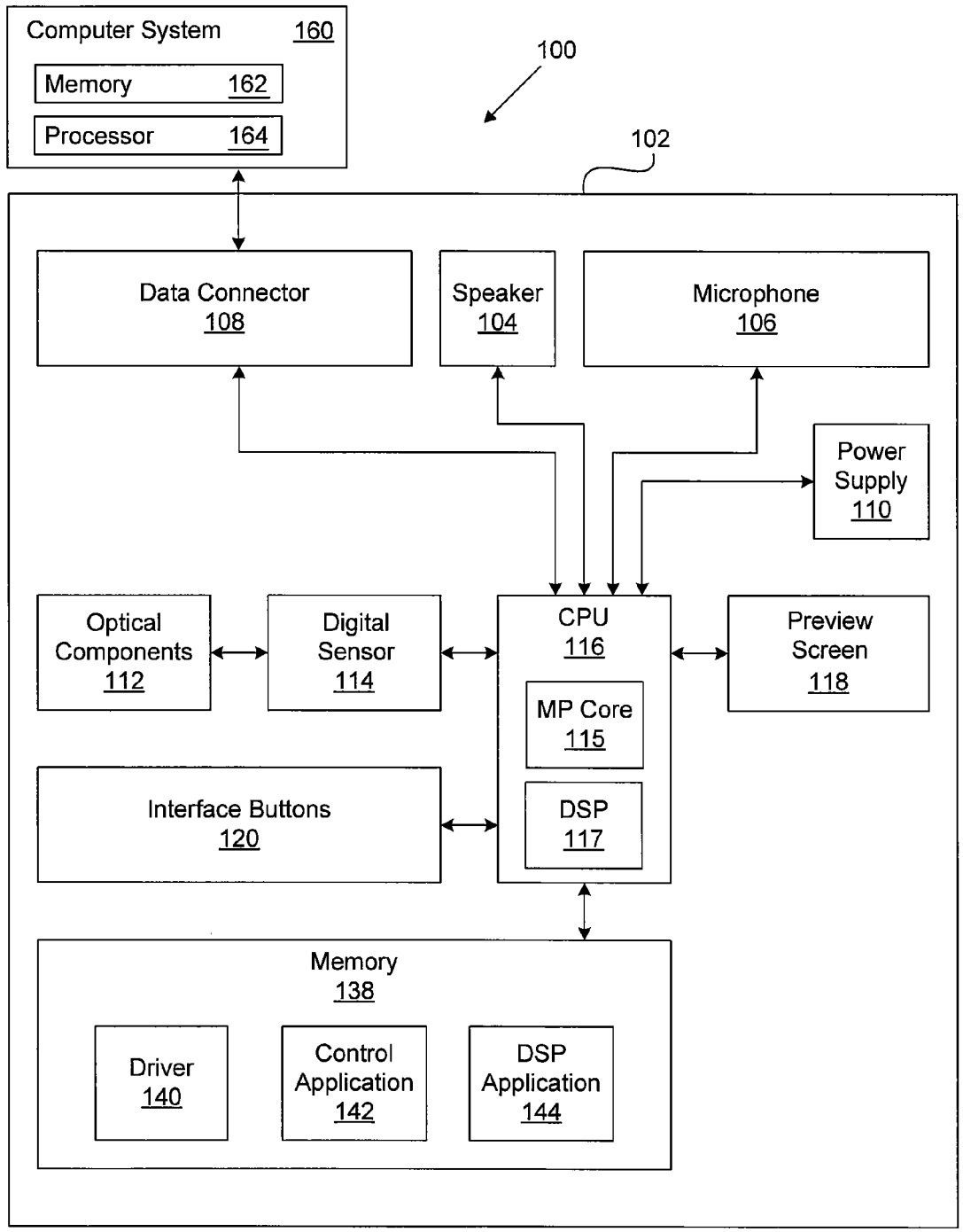
FIG. 1 is a block diagram of a system configured to implement one or more aspects of the invention.
Figure 2:
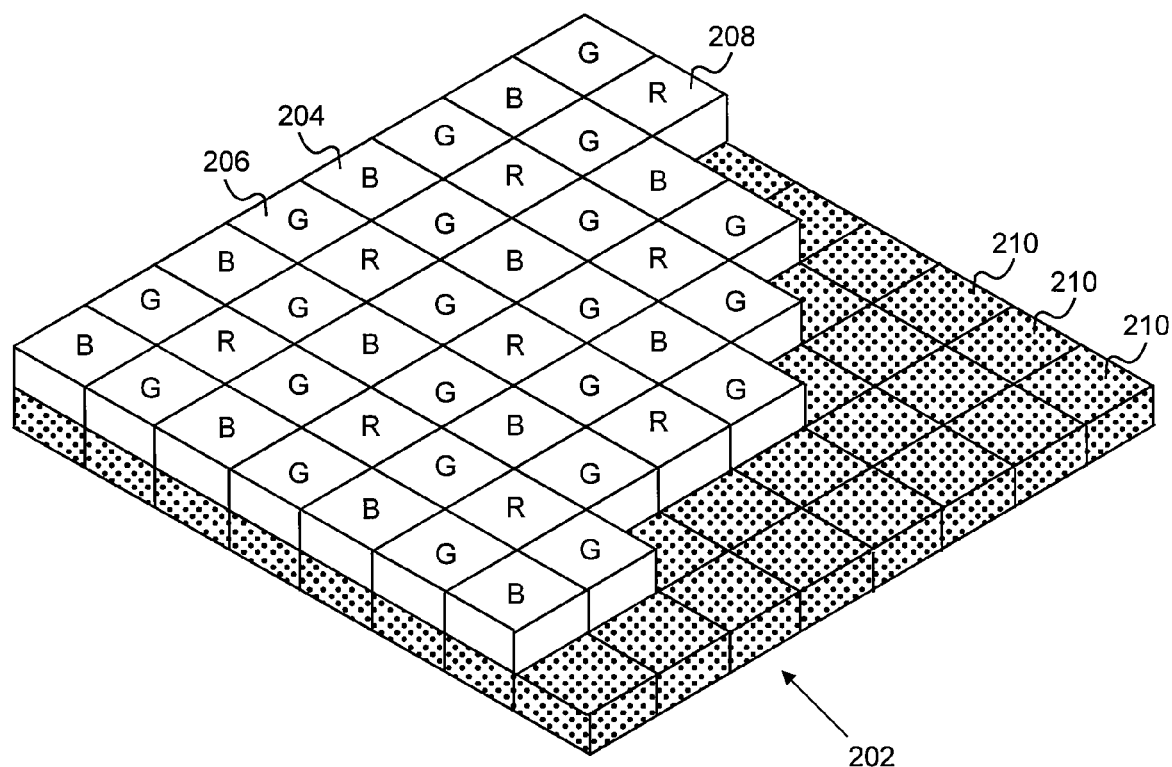
FIG. 2 is a conceptual diagram that illustrates a typical Bayer pattern, according to the prior art.
Figure 3A:
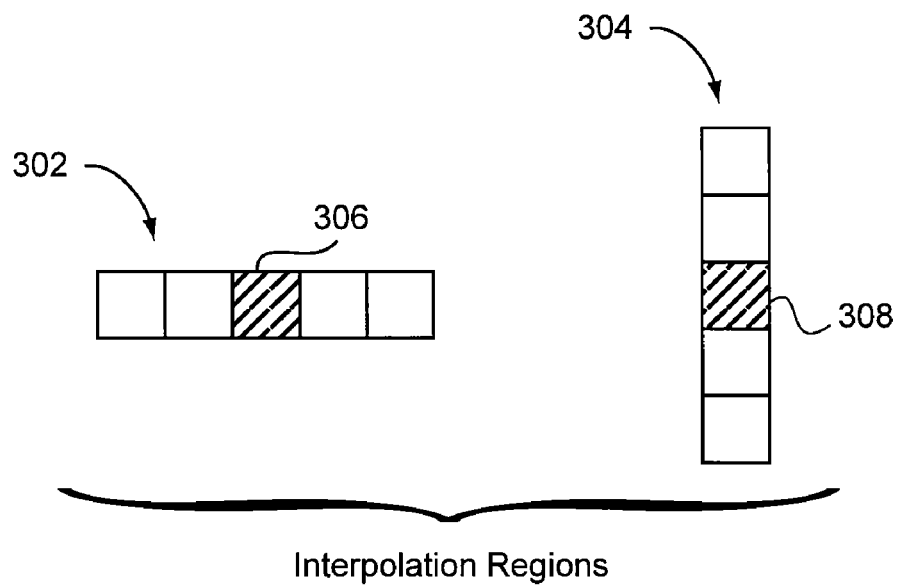
FIG. 3A is a conceptual diagram of interpolation regions, according to the prior art.
Figure 3B:
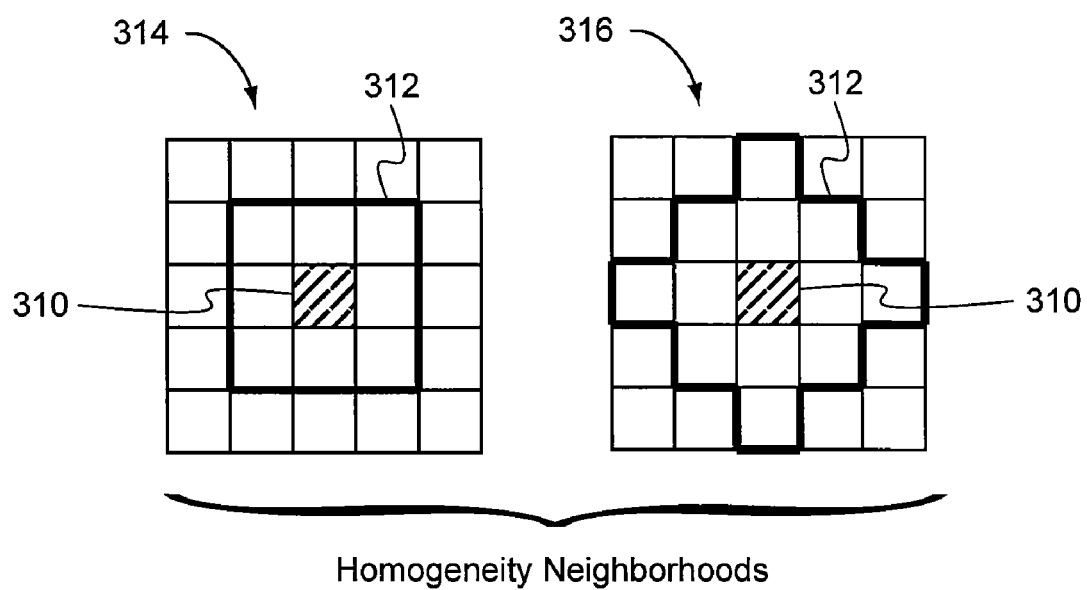
FIG. 3B is a conceptual diagram of homogeneity neighborhoods, according to the prior art.

FIG. 1 is a block diagram of a system 100 configured to implement one or more aspects of the invention. As shown, the system 100 includes a digital camera 102 and a computer system 160. The digital camera 102 includes, without limitation, a data connector 108, a speaker 104, a microphone 106, a power supply 110, optical components 112, a digital image sensor 114, a central processing unit (CPU) 116, a preview screen 118, interface buttons 120, and an internal memory 138. In one embodiment, the digital camera 102 is a one-time use and/or disposable digital camera. In alternative embodiments, the digital camera 102 is a reusable digital camera. In still further embodiments, the digital camera 102 is a digital video camera.

The data connector 108 is an integrated mechanism that allows the digital camera 102 to be coupled to the computer system 160 or to a separate TV, and to transfer data to and from the computer system 160 and/or output video and audio to the TV. The data connector 108 may be a universal serial bus (USB) connector, a firewire connector, a HDMI connector, a serial connector, or another type of connector that is capable of connecting the digital camera 102 with the computer system 160 or the TV. In alternative embodiments, the data connector 108 is not an integrated mechanism and may include a cable connector.

In one embodiment, the digital camera 102 is configured to capture still image data of a particular scene through the optical components 112 and the digital sensor 114. In alternative embodiments, the digital camera 102 may be configured to capture video data through the optical components 112 and the digital sensor 114 and to capture audio of the particular scene through the microphone 106. When the digital camera 102 is in an image capture mode or video capture mode, the preview screen 118 displays a preview of the image to be captured. When in a playback mode, the digital camera 102 is configured to show previously-captured digital images and/or digital videos (comprised of captured video data and audio data) that are stored in the internal memory 138. When the preview screen is displaying previously-captured digital video, the audio data associated with the digital video is output through the speaker 104. In alternative embodiments, the previously-captured digital images and/or digital videos may be output to the TV or to the computer system 160 for playback.

The power supply 110 provides power to the digital camera 102. The power may be provided by a battery or an external power source (e.g., an AC outlet). In one embodiment, the battery is a rechargeable battery that may or may not be removable from the digital camera 102.

The interface buttons 120 include a power button and a capture button. The power button is configured to turn the digital camera ON and OFF. When the digital camera 102 is in the image capture mode, the capture button is configured to initiate the capture of a still image; whereas, when the digital camera 102 is in the video capture mode, the capture button is configured to initiate the capture of a video sequence. In some embodiments, the other interface buttons, which may include a left button, a right button, an increase button, a decrease button, a display button, and/or a delete button, may be implemented as capacitive-touch buttons. In alternative embodiments, these other interface buttons may be implemented as mechanical buttons, induction buttons, analog-resistive buttons, or any other technically feasible button type or combination of button types.

The CPU 116 communicates with the various components within the digital camera 102 to control the operations of the digital camera 102. The CPU may be implemented as a single chip or as a combination of multiple chips. The CPU 116 also processes inputs from the interface buttons 120. For example, when the digital camera 102 is in the image capture mode or the video capture mode, the CPU 116 transmits the data received from the digital sensor 114 to the preview screen 118 for display. Similarly, the CPU 116 may transmit the data to the internal memory 138 for storage. The internal memory 138 also stores firmware that is executed by the CPU 116 to control the operations of the digital camera 102.

The CPU 116 may include a digital signal processor (DSP) 117 and/or a microprocessor (MP) core 115. The DSP 117 includes logic optimized to efficiently perform digital signal processing tasks, such as mathematically intensive computations. In one embodiment, the DSP 117 comprises a co-processor configured to execute instructions independently from the MP core 115. The MP core 115 may be configured to execute a control application 142 stored in the internal memory 138, and the DSP 117 may be configured to execute a DSP application 144, also stored in the internal memory 138. Persons skilled in the art will recognize that the control application 142 and the DSP application 144 may be loaded into the CPU 116 for execution. In one embodiment, the DSP application may reside in embedded memory within the CPU 116.

The internal memory 138 comprises either volatile memory, such as dynamic random access memory (DRAM), or non-volatile memory, such as a hard disk or a flash memory module, or a combination of both volatile and non-volatile memory. The internal memory 138 also stores a software driver 140 implemented as a set of program instructions configured to coordinate operation between the interface buttons 120 and the other components of the digital camera 102.

In various embodiments, the digital camera 102 may be coupled to the computer system 160 via the data connector 108. The computer system 160 may be any type of computing device, such as a laptop or a desktop computer, a server computer, or a video processing kiosk, and includes a memory 162 and a processor 164. Other components included in the computer system 106, such as a display device, a disk drive, user input devices, and the like, are omitted to avoid obscuring embodiments of the invention.

As set forth in greater detail herein, embodiments of the present invention involve techniques for processing image data. The image data may be of any origin. For example, the image data may be associated with one or more still images captured by the digital camera 102 or may be associated with one or more still images derived from video data captured by the digital camera 102. The image data also may be associated with one or more still images stored on the computer system 160 or downloaded to the computer system 160 or may be associated with one or more still images derived from video data stored on the computer system 160 or downloaded to the computer system 160. The image processing techniques disclosed herein may be implemented solely by the processing components within the digital camera 102, when the digital camera 102 is either coupled to or decoupled from the computer system 160, or may be implemented solely by the processing components within the computer system 160, when the digital camera 102 is either coupled to or decoupled from the computer system 160. In other embodiments, the image processing techniques may be implemented in part by the processing components within the digital camera 102 and in part by the processing components within the computer system 160 while the digital camera 102 is coupled to the computer system 160.

Figure 4:
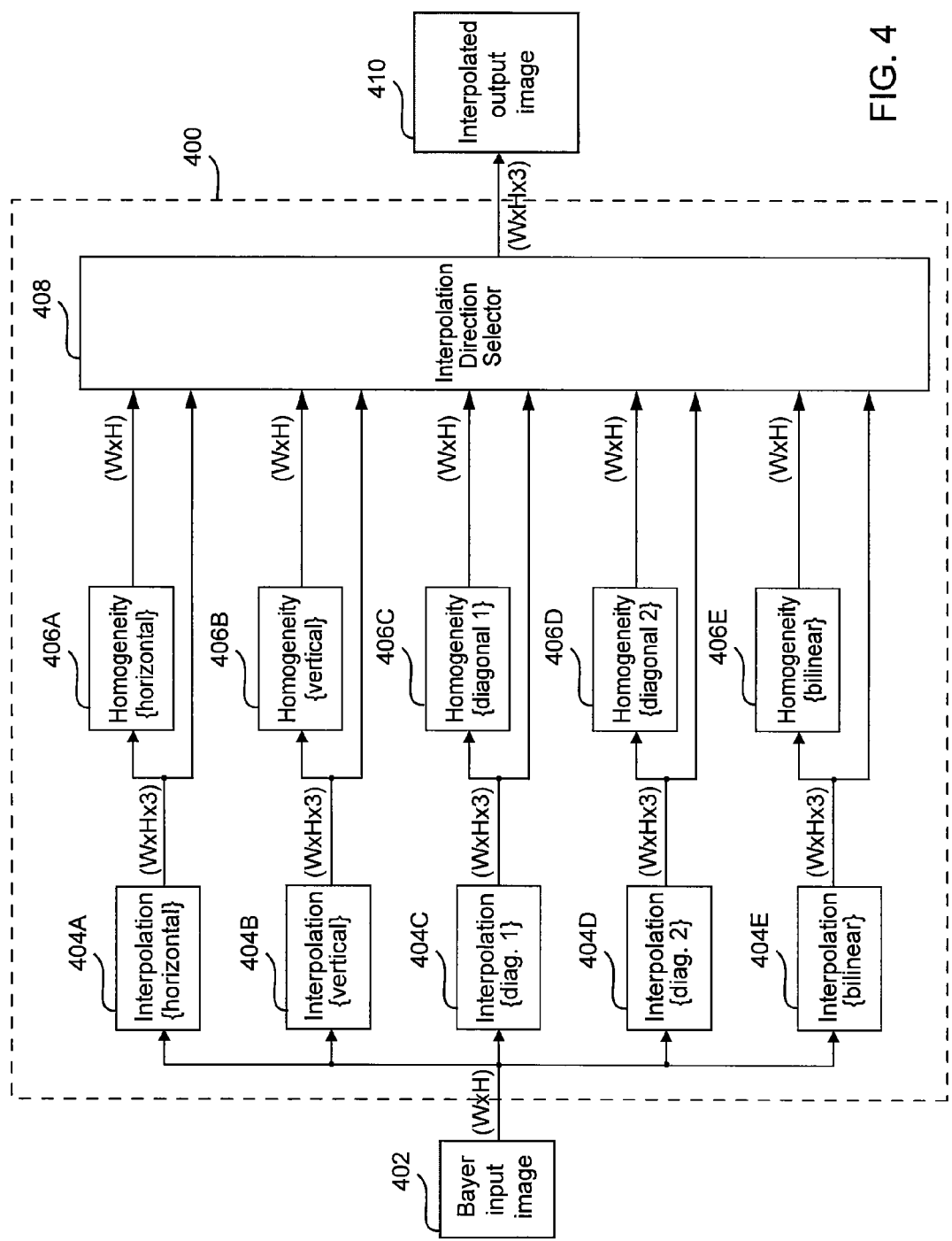
FIG. 4 is a conceptual diagram illustrating a demosaicing engine configured to adaptively interpolate an input image, according to one embodiment of the invention.

FIG. 4 is a conceptual diagram illustrating a demosaicing engine 400 configured to adaptively interpolate an input image 402, according to one embodiment of the invention. As shown, the demosaicing engine 400 receives the input image 402 and outputs an interpolated output image 410. In one embodiment, the input image 402 is a Bayer pattern image that comprises an array of color values. As described above, a Bayer pattern image is an RGB image that includes only one of three RGB color values at each pixel location.

In one embodiment of the invention, the demosaicing engine 400 is implemented as a set of software instructions stored in the internal memory 138 of the digital camera and/or the memory 162 included in the computer system 106 and/or some other memory or computer-readable medium. The set of software instructions may be executed by one or more of the processing components included in the digital camera 102, by one or more processing components included in the computer system 160, and/or in part by the one or more processing components within the digital camera 102 and in part by the one or more processing components within the computer system 160, where the digital camera 102 is coupled to or decoupled from the computer system 160.

Alternatively, the demosaicing engine 400 is implemented as a set of fixed-function and/or programmable hardware components. The hardware components may be included in one or more processing components included in the digital camera 102, one or more processing components included in the computer system 160, and/or a combination of the one or more processing components within the digital camera 102 and the one or more processing components within the computer system 160, where the digital camera 102 is coupled to or decoupled from the computer system 160. In still further embodiments, the demosaicing engine 400 is implemented as a combination of hardware and software.

Figure 5:
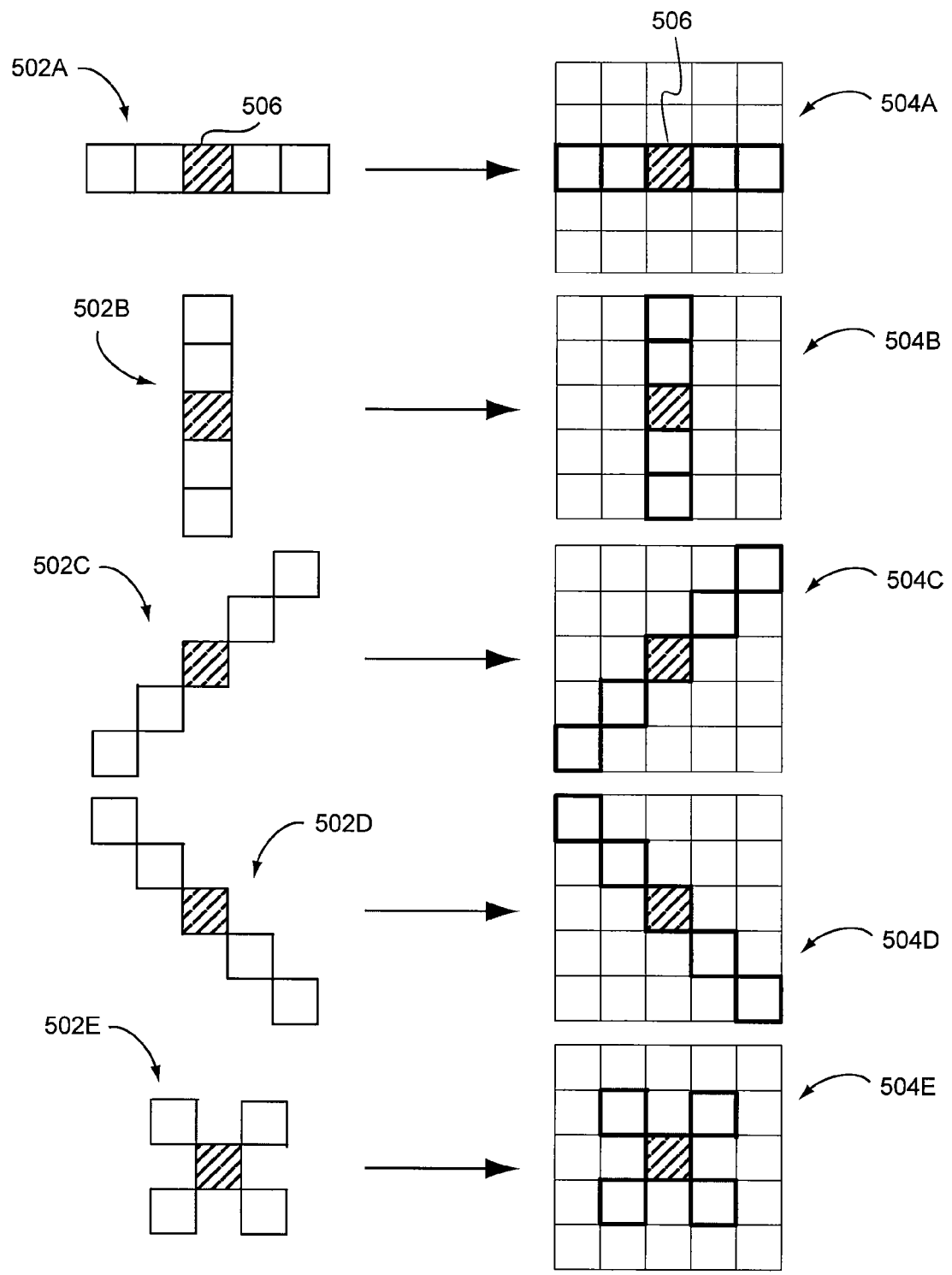
FIG. 5 is a conceptual diagram illustrating interpolation regions and corresponding homogeneity neighborhoods, according to one embodiment of the invention.

The demosaicing engine 400 includes a plurality of interpolation engines 404A-404E, a plurality of homogeneity engines 406A-406E, and an interpolation direction selector 408. The input image 402 is received by each of interpolation engine 404A-404E. Each interpolation engine 404A-404E is configured to generate an interpolation array by interpolating the input image 402 using a different interpolation direction. In one embodiment, the interpolation engine 404A comprises a horizontal interpolation engine and is configured to interpolate the input image 402 using a horizontal interpolation region. The interpolation engine 404B may comprise a vertical interpolation engine and is configured to interpolate the input image 402 using a vertical interpolation region. The interpolation engine 404C may comprise a first diagonal interpolation engine and is configured to interpolate the input image 402 using a first diagonal interpolation region. The interpolation engine 404D may comprise a second diagonal interpolation engine and is configured to interpolate the input image 402 using a second diagonal interpolation region. The interpolation engine 404E may comprise a bilinear interpolation engine and is configured to interpolate the input image 402 using a bilinear interpolation region. Examples of the interpolation regions used by interpolation engines 404A-404E, respectively, are illustrated in FIG. 5, which is described in greater detail below.

The output of each interpolation engine 404A-404E is an interpolation array that includes, for each pixel location, RGB color values interpolated from surrounding pixels using a particular interpolation direction. The color values in the interpolation array include, for each pixel location, a red color value, a green color value, and a blue color value. In one embodiment, the green color values are interpolated differently than red and blue color values.

In one embodiment, each interpolation engine 404A-404E is configured to interpolate green color values for each pixel location using a particular interpolation region. For each interpolation engine 404A-404E, the missing red and blue color values, in contrast, may be determined using a different approach. One approach uses bilinear interpolation on the difference of blue and green (or red and green), and then adds green to get blue (or red). For example, suppose the algorithm wants to interpolate the blue color value at the position denoted by X in the following array:

| B1 | G2 | B3 |
|----|----|----|
| G4 | X  | G6 |
| B7 | G8 | B9 |

First, a particular interpolation engine interpolates the green color values for each pixel location using a particular interpolation region, as described above, to compute the following green pixel value array:

| G1 | G2 | G3 |
|----|----|----|
| G4 | G5 | G6 |
| G7 | G8 | G9 |

To determine the missing blue value B5 the algorithm may calculate:

$$B5=((B1-G1)+(B3-G3)+(B7-G7)+(B9-G9))/4+G5$$

To find the missing blue value B2, which lies between two known blue pixel values horizontally, as shown in the following array:

| B1 | X  | B3 |
|----|----|----|
| G4 | R5 | G6 |
| B7 | G8 | B9, | then the algorithm may compute $B2=((B1-G1)+(B3-G3))/2+G2$

To find the missing blue value B4, which lies between two known blue pixel values vertically, as shown in the following array:

| B1 | G2 | B3 |
|----|----|----|
| X  | R5 | G6 |
| B7 | G8 | B9, | then the algorithm may compute $B4=((B1-G1)+(B7-G7))/2+G4$

Thus, the green color values are interpolated first using interpolation regions, and then the red and the blue color values are determined differently, as described herein. Although the red and blue color values may be interpolated in the same manner regardless of interpolation direction selected for the green color values, the red and blue values will be different depending on with which interpolation region the green color values are interpolated.

The homogeneity engines 406A-406E are each configured to receive as input an interpolation array from one of the interpolation engines 404A-404E. For example, the homogeneity engine 406A receives as input the interpolation array output from the interpolation engine 404A, the homogeneity engine 406B receives as input the interpolation array output from the interpolation engine 404B, the homogeneity engine 406C receives as input the interpolation array output from the interpolation engine 404C, the homogeneity engine 406D receives as input the interpolation array output from the interpolation engine 404D, and the homogeneity engine 406E receives as input the interpolation array output from the interpolation engine 404E.

Each homogeneity engine 406A-406E is configured to calculate, for each pixel location, a homogeneity value that indicates the number of pixel locations within a homogeneity neighborhood that have color space values within a threshold amount from the color space values at the pixel location. Examples of homogeneity neighborhoods are illustrated in FIG. 5, described in greater detail below. Each homogeneity engine 406A-406E is configured to output a homogeneity array that includes, for each pixel location, a homogeneity value. Calculating the homogeneity values is described in greater detail in FIG. 7.

The interpolation direction selector 408 receives an interpolation array from each interpolation engine 404A-404E and a homogeneity array from each homogeneity engine 406A-406E, where each interpolation array is associated with one homogeneity array. For example, the interpolation array output from the interpolation engine 404A is associated with the homogeneity array output from the homogeneity engine 406A. The interpolation direction selector 408 is configured to select, for each pixel location, the RGB color value included in the interpolation array that has the maximum homogeneity value in the corresponding homogeneity array at the same pixel location. The output of the interpolation direction selector 408 is the interpolated output image 410 that includes, for each pixel location, RGB color values.

To determine the RGB color values for the interpolated output image 410 at pixel location $P_{i,j}$, the interpolation direction selector 408 examines the homogeneity value at pixel location $P_{i,j}$ in each homogeneity array. For example, the interpolation direction selector 408 may receive a homogeneity array and a corresponding interpolation array for each of a horizontal interpolation direction, a vertical interpolation direction, a first diagonal interpolation direction, a second diagonal interpolation direction, and a bilinear interpolation direction. The interpolation direction selector 408 then selects the homogeneity array that corresponds to the maximum homogeneity value at pixel location $P_{i,j}$. Continuing with the example, suppose that the homogeneity values at pixel location $P_{i,j}$ in the five homogeneity arrays are 3 (horizontal), 4 (vertical), 3 (first diagonal), 5 (second diagonal), and 3 (bilinear). Calculating the homogeneity values is described in greater detail in FIG. 7. The largest homogeneity value is 5, which corresponds to the second diagonal homogeneity array. The interpolation direction selector 408 then selects the RGB color value at pixel location $P_{i,j}$ in the interpolation array associated with the second diagonal homogeneity array, i.e., the RGB color value at pixel location $P_{i,j}$ in the interpolation array output from the second diagonal interpolation engine. In this fashion, the interpolated output image 410 includes interpolated RGB color values where, for each pixel location, the selected RGB color values are interpolated using an interpolation direction that has the highest homogeneity at that particular pixel location.

In alternative embodiments, the functions described in FIG. 4 may be performed on only a portion of the input image 402. As used herein, a portion of the input image 402 may include all or some of the pixel locations in the input image 402. Additionally, in still further embodiments, there could be some additional selection criteria used to limit the directions that the interpolation direction selector 408 examines when selecting an output for a particular pixel location. In such a case, the interpolation direction selector 408, for one or more pixel locations, does not examine homogeneity values from every homogeneity array. In yet further embodiments, the RGB values included in the interpolation array include, for each pixel location, at least one interpolated color value. For example, if one of the color values is known based on the input image, then the two remaining color values are interpolated color values.

FIG. 5 is a conceptual diagram illustrating interpolation regions 502A-502E and corresponding homogeneity neighborhoods 504A-504E, according to one embodiment of the invention. As shown, the interpolation regions 502A-502E include a horizontal interpolation region 502A, a vertical interpolation region 502B, a first diagonal interpolation region 502C, a second diagonal interpolation region 502D, and a bilinear interpolation region 502E. In one embodiment, each interpolation engine 404A-404E shown in FIG. 4 is configured to interpolate the input image 402 to generate an interpolation array using one of the interpolation regions 502A-502E, respectively. As described above, in one embodiment, the interpolation engines 404A-404E use interpolation directions to determine one or more of the green color values in the corresponding interpolation array; whereas, red and blue color values are computed differently.

The homogeneity neighborhoods 504A-504E include a horizontal homogeneity neighborhood 504A, a vertical homogeneity neighborhood 504B, a first diagonal homogeneity neighborhood 504C, a second diagonal homogeneity neighborhood 504D, and a bilinear homogeneity neighborhood 504E. In one embodiment, each homogeneity engine 406A-406E shown in FIG. 4 is configured to generate a homogeneity array using one of the homogeneity neighborhoods 502A-502E, respectively.

In one embodiment, the homogeneity neighborhood used by a particular homogeneity engine to generate the homogeneity array comprises the same pixel locations as the interpolation region used by the corresponding interpolation engine to generate at least some of the color values in the interpolation array that is input to the particular homogeneity engine. For example, the interpolation region 502A includes the two pixel locations to the left of the pixel location in question 506 and the two pixel locations to the right of the pixel location in question 506. Similarly, the homogeneity neighborhood 504A, which corresponds to the interpolation region 502A, includes the two pixel locations to the left of the pixel location in question 506 and the two pixel locations to the right of the pixel location in question 506. Advantageously, since the same pixel locations are included in the interpolation region and the corresponding homogeneity neighborhood, the interpolated output image 410 includes fewer artifacts when compared to images interpolated using prior art approaches.

Figure 6:
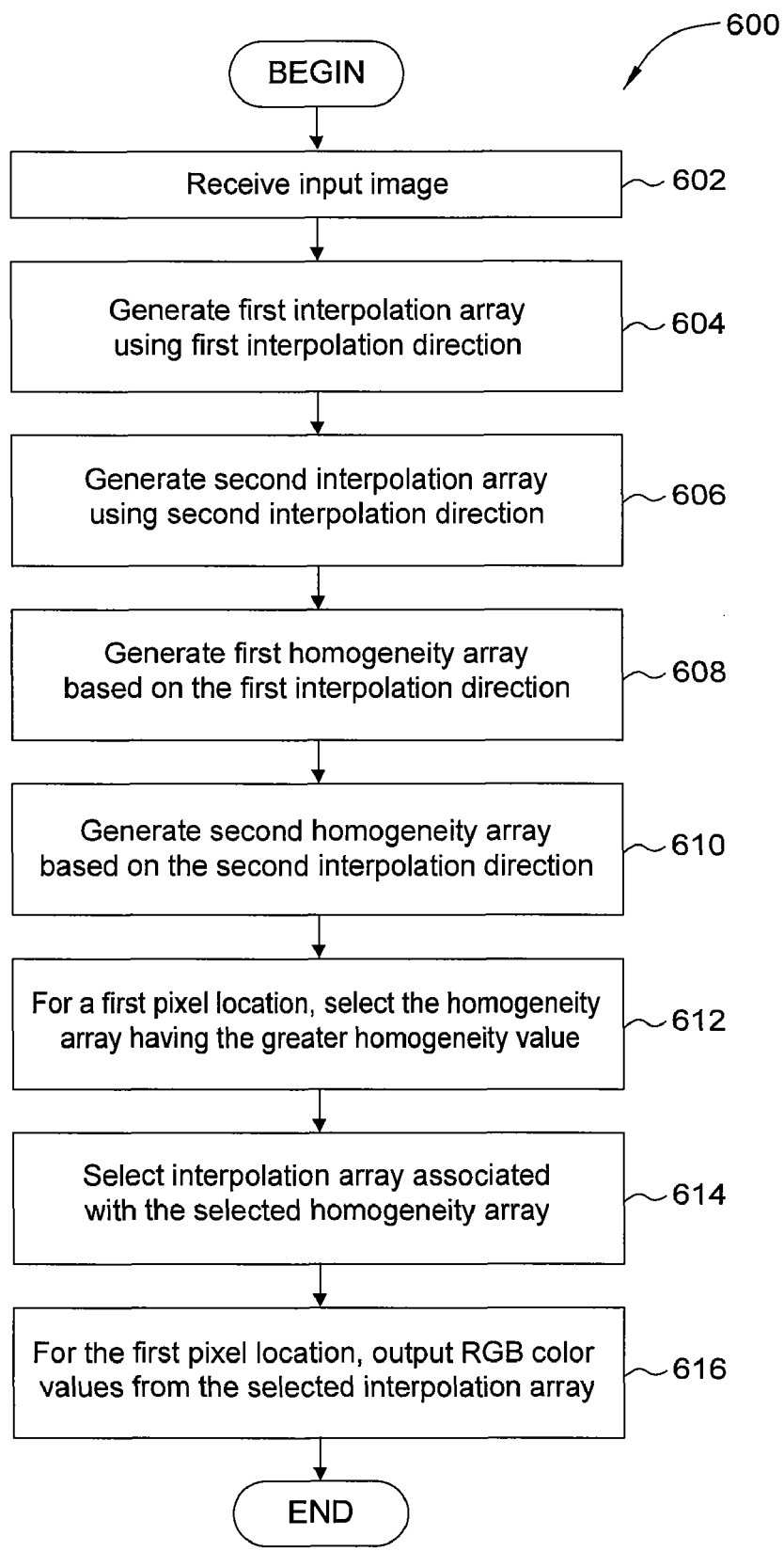
FIG. 6 is a flow diagram of method steps for generating an interpolated output image, according to one embodiment of the invention.

FIG. 6 is a flow diagram of method steps for generating an interpolated output image 410, according to one embodiment of the invention. Persons skilled in the art will understand that, even though the method is described in conjunction with the systems of FIGS. 1, 4, and 5, any system configured to perform the method steps, in any order, is within the scope of the present invention.

As shown, the method 600 begins at step 602, where the demosaicing engine 400 receives the input image 402. In one embodiment, the input image 402 comprises a Bayer pattern image, where, for each pixel location, the input image 402 includes one color value of the three RGB color values.

At step 604, a first interpolation engine included in the demosaicing engine 400 interpolates the input image 402 using a first interpolation direction. In one embodiment, the first interpolation engine comprises interpolation engine 404A configured to interpolate the input image 402 using horizontal interpolation. As described herein, the green color values may be interpolated using horizontal interpolation; whereas, red and blue color values may be determined after green is found by using a bilinear procedure on color differences. As shown in FIG. 5, interpolation region 502A is an example of an interpolation region used to perform horizontal interpolation.

At step 606, a second interpolation engine included in the demosaicing engine 400 interpolates the input image 402 using a second interpolation direction. In one embodiment, the second interpolation engine comprises interpolation engine 404B configured to interpolate the input image 402 using vertical interpolation. Again, as described herein, the green color values may be interpolated using vertical interpolation; whereas, red and blue color values may be determined after green is found by using a bilinear procedure based on color differences. As shown in FIG. 5, interpolation region 502B is an example of an interpolation region used to perform vertical interpolation.

In one embodiment, the step 604 and/or step 606 are repeated for additional interpolation directions, including, without limitation, a first diagonal interpolation direction, a second diagonal interpolation direction, and/or a bilinear interpolation direction. Examples of interpolation regions used when interpolating using the first diagonal interpolation direction, the second diagonal interpolation direction, and/or the bilinear interpolation direction are illustrated in FIG. 5 as interpolation regions 502C, 502D, and 502E, respectively. In some embodiments, interpolating color values using an interpolation region is performed using linear filtering. In one embodiment, linear filtering may be performed with an appropriately-shaped filtering "kernel." In other embodiments, linear filtering is performed using any technically feasible approach.

At step 608, a first homogeneity engine generates a first homogeneity array based on the first interpolation array, where a homogeneity neighborhood used to calculate the homogeneity values in the first homogeneity array comprises the same pixel locations as the interpolation region used by the first interpolation engine to generate the first interpolation array. In one embodiment, the first homogeneity engine comprises homogeneity engine 406A configured to generate the first homogeneity array using the homogeneity neighborhood 504A, which includes the same pixel locations as the interpolation region 502A used by the interpolation engine 404A to generate the interpolation array.

At step 610, a second homogeneity engine generates a second homogeneity array based on the second interpolation array, where a homogeneity neighborhood used to calculate the homogeneity values in the second homogeneity array comprises the same pixel locations as the interpolation region used by the second interpolation engine to generate the second interpolation array. In one embodiment, the second homogeneity engine comprises homogeneity engine 406B configured to generate the second homogeneity array using the homogeneity neighborhood 504B, which includes the same pixel locations as the interpolation region 502B used by the interpolation engine 404B to generate the interpolation array.

In some embodiments, step 608 and/or step 610 are repeated for additional homogeneity neighborhoods, including, without limitation, a first diagonal homogeneity neighborhood, a second diagonal homogeneity neighborhood, and/or a bilinear homogeneity neighborhood. Calculating the homogeneity values is described in greater detail in FIG. 7.

At step 612, the interpolation direction selector 408 selects, for a first pixel location, the homogeneity array that includes the largest homogeneity value at the first pixel location. In one embodiment, the largest homogeneity value at the first pixel location may be the same value in two or more homogeneity arrays. In this case, a default homogeneity array may be selected. For example, using the five homogeneity neighborhoods and interpolation regions described herein, the default ordering may comprise, from first to last, (1) horizontal interpolation/neighborhood, (2) vertical interpolation/neighborhood, (3) first diagonal interpolation/neighborhood, (4) second diagonal interpolation/neighborhood, and (5) bilinear interpolation/neighborhood.

At step 614, the interpolation direction selector 408 selects the interpolation array that is associated with the homogeneity array selected at step 612. As described in FIG. 4, each homogeneity array is associated with one interpolation array.

At step 616, for the first pixel location, the interpolation direction selector 408 outputs, from the interpolation array selected at step 614, the RGB color values corresponding to the first pixel location. For example, suppose that the pixel location $P_{i,j}$ is the pixel in question. The interpolation direction selector 408 examines each homogeneity array at pixel location $P_{i,j}$ (step 612) and determines that the homogeneity value at pixel location $P_{i,j}$ is largest in the homogeneity array that generated the homogeneity values using a "vertical" homogeneity neighborhood. The interpolation direction selector 408 then selects the interpolation array associated with the vertical interpolation region (step 614). The interpolation direction selector 408 then outputs, at pixel location $P_{i,j}$, the RGB color values at pixel location $P_{i,j}$ in the interpolation array where the interpolated RGB color values are generated using a vertical interpolation region. In one embodiment, one or more of the method steps illustrated in FIG. 6 is repeated to determine the RGB color values of one or more pixel locations in the interpolated output image 410. For example, the techniques described in FIG. 6 may be used to generate the RGB color values of the output image for each pixel in the output image, or for a region of pixels in the output image. Also, the RGB color values for the one or more pixel locations may each be selected from different interpolation arrays, as described herein. As also described herein, in alternative embodiments, some other selection criteria may limit the number of homogeneity arrays that the interpolation direction selector 408 examines at a particular pixel location.

Figure 7:
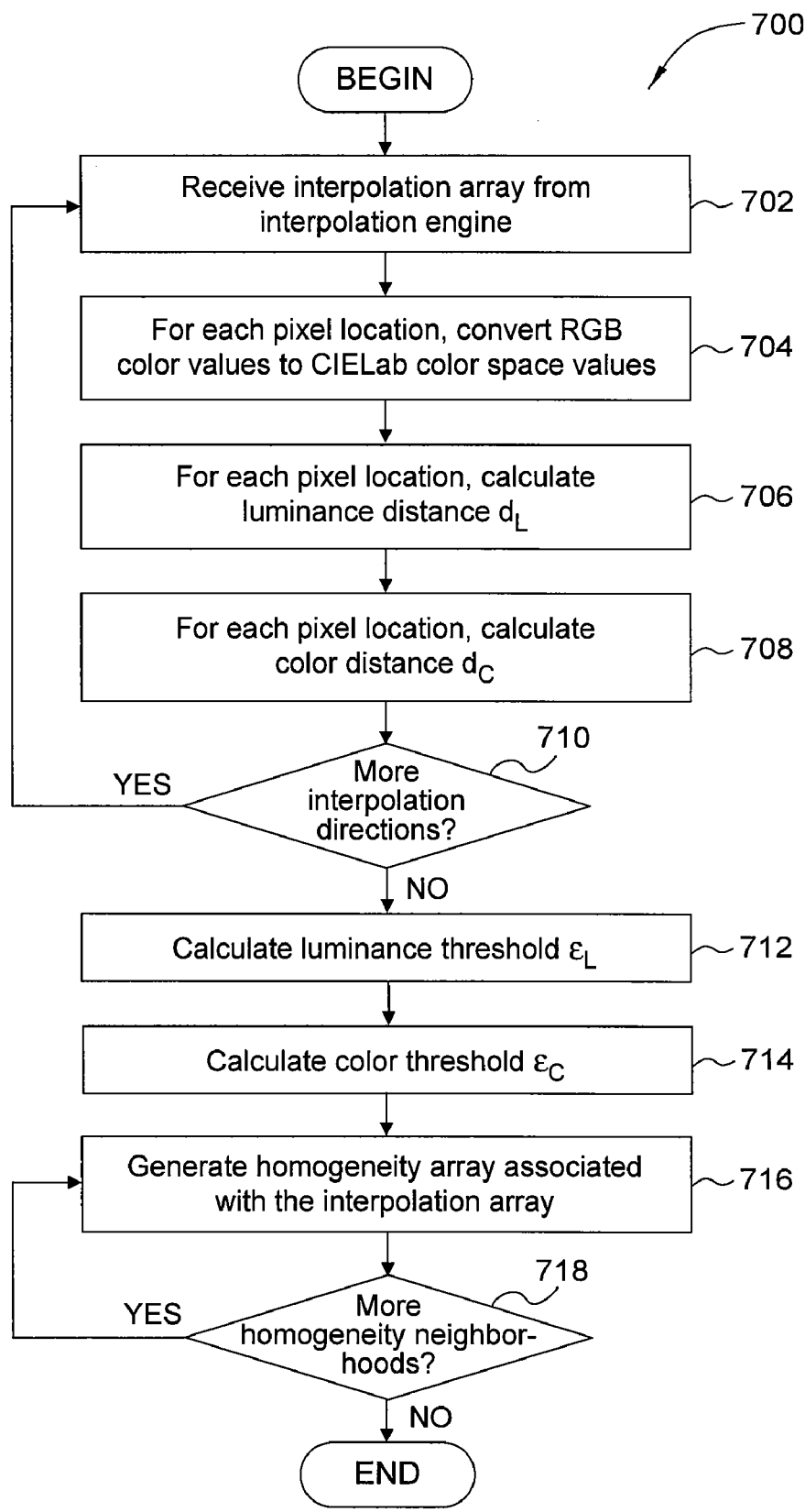
FIG. 7 is a flow diagram of method steps for calculating homogeneity values included in one or more homogeneity arrays, according to one embodiment of the invention.

FIG. 7 is a flow diagram of method steps for calculating homogeneity values included in one or more homogeneity arrays, according to one embodiment of the invention. Persons skilled in the art will understand that, even though the method is described in conjunction with the systems of FIGS. 1, 4, and 5, any system configured to perform the method steps, in any order, is within the scope of the present invention.

As shown, the method 700 begins at step 702, where a homogeneity engine receives an interpolation array from an interpolation engine. For example, homogeneity engine 406A may receive an interpolation array from interpolation engine 404A. The interpolation array may include, for each pixel location, RGB color values interpolated, at least in part, using horizontal interpolation region 502A.

At step 704, the homogeneity engine converts, for each pixel location, the RGB color values to CIELab color space values. CIELab color space is a color space where each pixel is represented by three values including a luminance value (L) and two color (or chrominance) values (A and B). In alternative embodiments, the RGB color values are converted to color values in another color space, other than CIELab color space, which includes a luminance component value and two color (or chrominance) values. In still further embodiments, RGB color values are converted to any other color space.

At step 706, the homogeneity engine calculates, for each pixel location, one or more luminance distances $d_L$. Each luminance distance represents the difference between the luminance value of a pixel in question and another pixel in the homogeneity neighborhood of the pixel in question. In one embodiment, the homogeneity engine may calculate, for each pixel location, a luminance distances $d_L$ between the pixel in question and all of the other pixel locations within the homogeneity neighborhood of the pixel in question to generate a "set of luminance distances" for the pixel in question. Luminance distance $d_L$ may be calculated using the following equation, where $y_{1,L}$ is the luminance value in CIELab color space of the pixel in question $y_1$, and $y_{n,L}$ is the luminance value in CIELab color space a pixel location within the homogeneity neighborhood of the pixel in question $y_1$:

$$d_L = |y_{1,L} - y_{n,L}|  \quad \text{(Equation 1)}$$

As described herein, the set of pixel locations within the homogeneity neighborhood of pixel $y_1$ depends on the shape of the homogeneity neighborhood.

At step 708, the homogeneity engine calculates, for each pixel location, one or more color distances $d_C$. Each color distance represents the difference between the color values of a pixel in question and another pixel in the homogeneity neighborhood of the pixel in question. In one embodiment, the homogeneity engine may calculate, for each pixel location, a color distances $d_C$ between the pixel in question and all of the other pixel locations within the homogeneity neighborhood of the pixel in question to generate a "set of color distances" for the pixel in question. Color distance $d_C$ may be calculated using the following equation, where $y_{1,a}$ and $y_{1,b}$ are the color values in CIELab color space of the pixel in question $y_1$, and $y_{n,a}$ and $y_{n,b}$ are the color values in CIELab color space a pixel location within the homogeneity neighborhood of the pixel in question $y_1$:

$$d_C = \sqrt{(y_{1,a} - y_{n,a})^2 + (y_{1,b} - y_{n,b})^2} \quad \text{(Equation 2)}$$

Again, as described herein, the set of pixel locations within the homogeneity neighborhood of pixel $y_1$ depends on the shape of the homogeneity neighborhood.

At step 710, if there are additional interpolation directions for which to calculate luminance distance $d_L$ and color distance $d_C$, then the method 700 returns to step 702, and steps 702, 704, 706, and 708 are repeated for the additional interpolation directions. For example, a set of luminance distances and a set of color distances may be calculated for each pixel location in five different interpolation directions, as described in FIG. 4. In one embodiment, one or more homogeneity engines perform the steps 702, 704, 706, and 708.

At step 712, the demosaicing engine 400 calculates a luminance threshold $\epsilon_L$. The luminance threshold $\epsilon_L$ is indicative of a threshold amount for the luminance distance $d_L$ between a pixel in question and another pixel within the homogeneity neighborhood of the pixel in question, where the pixel in question and other pixel are considered to have a similar luminance value. In one embodiment, the luminance threshold $\epsilon_L$ may be calculated using the following equation:

$$\epsilon_L = \min(\max_{neighborhood\_n}(d_L)) \quad \text{(Equation 3)}$$

In Equation 3, the maximum value of the luminance distance $d_L$ is determined for each homogeneity neighborhood, where n is the number of different homogeneity neighborhoods. Then, the luminance threshold $\epsilon_L$ is established as the minimum of the set of maximum luminance distances. For example, suppose there are five different homogeneity neighborhoods for which a set of luminance distances is calculated at each pixel location. For each homogeneity neighborhood, a maximum luminance distance is determined. Then, the luminance threshold $\epsilon_L$ is established as the minimum of those five maximum luminance distances.

At step 714, the demosaicing engine 400 calculates a color threshold $\epsilon_C$. The color threshold $\epsilon_C$ is indicative of a threshold amount for the color distance $d_C$ between a pixel in question and another pixel within the homogeneity neighborhood of the pixel in question, where the pixel in question and other pixel are considered to have a similar color values. In one embodiment, the color threshold $\epsilon_C$ may be calculated using the following equation:

$$\epsilon_C = \min(\max_{neighborhood\_n}(d_C)) \quad \text{(Equation 4)}$$

In Equation 4, the maximum value of the color distance $d_C$ is determined for each homogeneity neighborhood, where n is the number of different homogeneity neighborhoods. Then, the color threshold $\epsilon_C$ is established as the minimum of the set of maximum color distances. For example, suppose there are five different homogeneity neighborhoods for which a set of color distances is calculated at each pixel location. For each homogeneity neighborhood, a maximum color distance is determined. Then, the color threshold $\epsilon_C$ is established as the minimum of those five maximum color distances.

At step 716, the homogeneity engine generates, for a particular homogeneity neighborhood, a homogeneity array associated with the interpolation array, where the homogeneity array includes a homogeneity value for each pixel location. The homogeneity value indicates, for each pixel location, the number of pixel locations within the homogeneity neighborhood for a pixel in question that have a luminance distance $d_L$ to the pixel in question that is less than or equal to the luminance threshold $\epsilon_L$ and a color distance $d_C$ to the pixel in question that is less than or equal to the color threshold $\epsilon_C$. As stated, the homogeneity array generated at step 716 is associated with a particular homogeneity neighborhood.

At step 718, the demosaicing engine 400 determines whether a homogeneity array is to be calculated for additional homogeneity neighborhoods. If so, then the method 700 returns to step 718, and step 718 is repeated. In one embodiment, the luminance threshold $\epsilon_L$ and the color threshold $\epsilon_C$ used to generate the homogeneity array is the same for each homogeneity array generated at step 716. In, at step 718, there are no more additional homogeneity neighborhoods for which to generate a homogeneity array, then the method 700 terminates. The one or more homogeneity maps generated by the method 700 may be used to select, for a particular pixel location, the interpolation direction that achieves the best result. As described in FIG. 6, at steps 612 and 614, the interpolation direction selector selects, for a first pixel location, the homogeneity array having the largest homogeneity value, and outputs, for the first pixel location, the RGB color value in the interpolation array that corresponds to the selected homogeneity array for the particular pixel location.

In alternative embodiments, adaptive image smoothing may be used in combination with adaptive interpolation techniques described in FIGS. 1 and 4-7.

Figure 8:
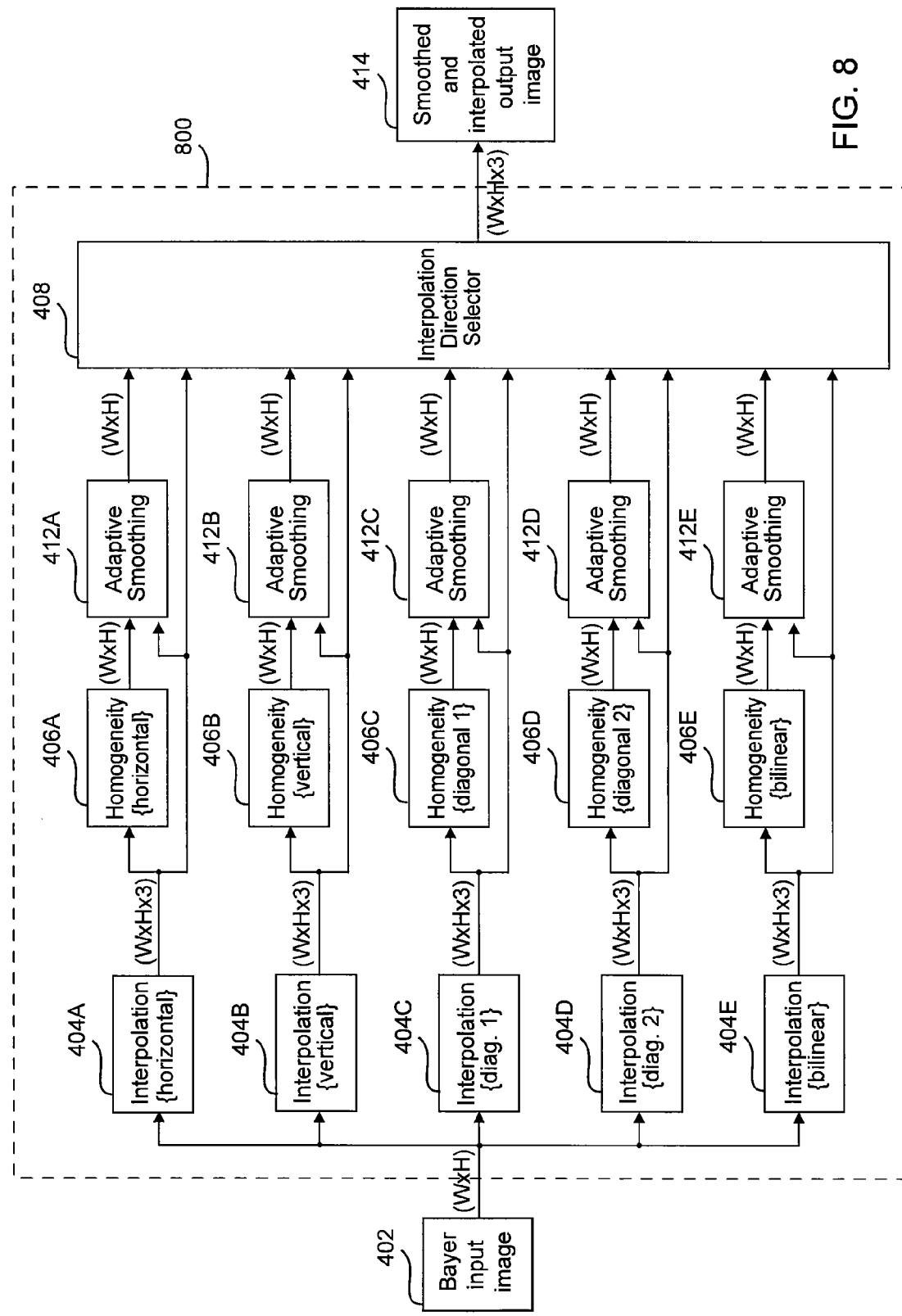
FIG. 8 is a conceptual diagram illustrating a demosaicing engine configured to adaptively interpolate and to adaptively smooth one or more homogeneity arrays, according to one embodiment of the invention.

FIG. 8 is a conceptual diagram illustrating a demosaicing engine 800 configured to adaptively interpolate and to adaptively smooth one or more homogeneity arrays, according to one embodiment of the invention. As shown, the demosaicing engine 800 receives the input image 402 and outputs a smoothed and interpolated output image 414. In one embodiment, the input image 402 is substantially similar to the input image 402 described in FIG. 4. The input image 402 is received by one or more interpolation engines 404A-404E, each configured to generate a different interpolation array that is received by a corresponding homogeneity engine 406A-406E, respectively, where each interpolation-engine/homogeneity-engine pair is associated with a particular interpolation region and homogeneity neighborhood, as described in FIG. 4.

Additionally, the demosaicing engine includes smoothing engines 412A-412E. Each smoothing engine is configured to perform a smoothing operation at one or more pixel locations based on the "noisiness" of the homogeneity array in a particular region of the homogeneity array. If a region of the homogeneity array has a high level of detail (e.g., many edges in many different directions), then higher-quality images are achieved by not smoothing the homogeneity array in those regions. To determine which regions of the homogeneity array to smooth and which to not smooth, the smoothing engine creates a binary array, where each entry in the binary array corresponds to a pixel location, and a value of "1" indicates that the pixel lies in a region of the homogeneity array having high spatial frequency and should not be smoothed, and a value of "0" indicates that the pixel lies in a region of the homogeneity array having low spatial frequency and should be smoothed.

In one embodiment, each smoothing engine receives the homogeneity array from the corresponding homogeneity engine and receives the interpolation array from the corresponding interpolation engine. The smoothing engine generates a smoothed homogeneity array that comprises the homogeneity array received from the homogeneity engine smoothed by a N×N box filter, where N is an integer. The smoothing engine is then configured to compose an adaptively smoothed homogeneity array where, for each pixel location, the homogeneity value is either the homogeneity value in the original homogeneity array or a smoothed homogeneity value in the smoothed homogeneity array, based on a binary array. In one embodiment, the smoothing engine selects the original homogeneity value where the binary array includes a "0" at that particular pixel location, and the smoothing engine selects the smoothed homogeneity value where the binary map includes a "1" at that particular pixel location.

To generate the binary array, the smoothing engine calculates, for each pixel location in the interpolation array, variances of the red, green, and blue color values in a 5×5 region around the pixel in question. In one embodiment, the smoothing engine generates the binary array so that, for each pixel location, the binary array includes a value of "1" (i.e., use smoothed homogeneity value) where the following equation is a logical TRUE, where X is an integer:

$$(\sigma_R^2 > X \cdot \sigma_G^2) \cup (\sigma_B^2 > X \cdot \sigma_G^2)$$ (Equation 5)

If, for a particular pixel location, Equation 5 is a logical FALSE, then the binary array includes a value of "0" (i.e., use non-smoothed/original homogeneity value). The entries of the binary may, in some embodiments, may be dilated using a M×M dilation element. In one embodiment, M=15.

In one embodiment, a single binary array is generated for a particular interpolation direction and the same binary array is used by each smoothing engine 412A-412E to generate the adaptive smoothed homogeneity array. In alternative embodiments, each smoothing engine may generate a different binary array. In further embodiments, the different binary arrays are generated by each smoothing engine using the same interpolation region as the homogeneity neighborhood used by the corresponding homogeneity engine to generate the homogeneity array.

One advantage of the systems and methods described herein is that better image quality is achieved when compared to using prior art techniques. The techniques described herein utilize, in some embodiments, five different interpolation directions, which reduces zippering artifacts. The zippering artifacts are especially reduced along diagonal edges in the image. Also, since the homogeneity neighborhood used by each homogeneity engine is the same as the interpolation region used by the corresponding interpolation engine to generate the interpolation array, less homogeneity noise is introduced into the interpolation direction selection process. Accordingly, better image quality is a result of choosing the most appropriate interpolation direction for a given pixel location.

While the forgoing is directed to embodiments of the invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for generating an interpolated output image, comprising:
generating a first interpolation array, using one or more processors, for a portion of an input image based on a first interpolation region, wherein each pixel location in the portion includes a red color value, a green color value, or a blue color value, and the first interpolation array includes, at each pixel location in the portion, red, green, and blue (RGB) color values, at least one of which is interpolated;
generating a second interpolation array based on a second interpolation region and including, at each pixel location in the portion, RGB color values, at least one of which is interpolated;
generating a first homogeneity array based on the first interpolation array that includes, at each pixel location in the portion, a homogeneity value calculated based on a first homogeneity neighborhood that includes the same pixel locations as the first interpolation region;
generating a second homogeneity array based on the second interpolation array that includes, at each pixel location in the portion, a homogeneity value calculated based on a second homogeneity neighborhood that includes the same pixel locations as the second interpolation region;
determining that, for a first pixel location in the portion, the homogeneity value in the first homogeneity array is greater than the homogeneity value in the second homogeneity array; and
outputting to a display or to a memory the RGB color values at the first pixel location in the first interpolation array.

2. The method of claim 1, wherein each of the first interpolation region and the second interpolation region is selected from a group of at least three different interpolation regions.

3. The method of claim 2, wherein each of the first interpolation region and the second interpolation region comprises one of a horizontal interpolation region, a vertical interpolation region, a first diagonal interpolation region, a second diagonal interpolation region, and a bilinear interpolation region.

4. The method of claim 1, further comprising:
converting each of the RGB color values included in the first interpolation array to another color space that includes a luminance value, a first chrominance value, and a second chrominance value; and
calculating, at each pixel location in the portion, a set of luminance distances, wherein each luminance distance indicates a difference between the luminance value at the pixel location and the luminance value at another pixel location in the first homogeneity neighborhood associated with the pixel location.

5. The method of claim 4, further comprising calculating, at each pixel location in the portion, a set of color distances, wherein each color distance indicates a difference between the chrominance values at the pixel location and the chrominance values at another pixel location in the first homogeneity neighborhood associated with the pixel location.

6. The method of claim 5, further comprising computing a luminance threshold based on the calculated luminance distances that indicates a similarity of luminance values at two different pixel locations within one of the homogeneity neighborhoods.

7. The method of claim 6, further comprising computing a color threshold based on the calculated color distances that indicates a similarity of chrominance values at two different pixel locations within one of the homogeneity neighborhoods.

8. The method of claim 7, wherein generating the first homogeneity array comprises, at each pixel location in the portion, determining a number of pixel locations within the first homogeneity neighborhood having a luminance distance below the luminance threshold and a color distance below the color threshold.

9. The method of claim 1, further comprising:
generating a third homogeneity array based on a third interpolation array that includes, at each pixel location in the portion, a homogeneity value calculated based on a third homogeneity neighborhood having the same pixel locations as a third interpolation region used to generate the third interpolation array;
generating a fourth homogeneity array based on a fourth interpolation array that includes, at each pixel location in the portion, a homogeneity value calculated based on a fourth homogeneity neighborhood having the same pixel locations as a fourth interpolation region used to generate the fourth interpolation array; and
generating a fifth homogeneity array based on a fifth interpolation array that includes, at each pixel location in the portion, a homogeneity value calculated based on a fifth homogeneity neighborhood having the same pixel locations as a fifth interpolation region used to generate the fifth interpolation array.

10. The method of claim 9, further comprising determining that, at the first pixel location, the homogeneity value in the first homogeneity array is greater than the homogeneity value in the third homogeneity array, the homogeneity value in the first homogeneity array is greater than the homogeneity value in the fourth homogeneity array, and the homogeneity value in the first homogeneity array is greater than the homogeneity value in the fifth homogeneity array.

11. The method of claim 1, further comprising generating a smoothed homogeneity array by applying a smoothing filter to the first homogeneity array, wherein the smoothed homogeneity array includes, at each pixel location in the portion, a smoothed homogeneity value.

12. The method of claim 11, further comprising generating a binary array based on the first interpolation array that includes, at each pixel location in the portion, a binary value indicating whether a red variance, a green variance, or a red variance is outside a particular threshold.

13. The method of claim 12, further comprising selecting, at each pixel location in the portion, either the homogeneity value from the homogeneity array corresponding to the pixel location or the smoothed homogeneity value from the smoothed homogeneity array corresponding to the pixel location based on the value in binary array at the pixel location.

14. The method of claim 1, wherein the portion is equivalent to the entire input image.

15. The method of claim 1, wherein each of the green color values in the first interpolation array that is interpolated is derived directly from the first interpolation region, and wherein each blue color value in the first interpolation array that is interpolated and each red color value in the first interpolation array that is interpolated is computed based on at least one of the green color values in the first interpolation array.

16. A computer-readable medium storing instructions that, when executed by a processor, cause the processor to generate an interpolated output image, by performing the steps of:
generating a first interpolation array for a portion of an input image based on a first interpolation region, wherein each pixel location in the portion includes a red color value, a green color value, or a blue color value, and the first interpolation array includes, at each pixel location in the portion, red, green, and blue (RGB) color values, at least one of which is interpolated;
generating a second interpolation array based on a second interpolation region and including, at each pixel location in the portion, RGB color values, at least one of which is interpolated;
generating a first homogeneity array based on the first interpolation array that includes, at each pixel location in the portion, a homogeneity value calculated based on a first homogeneity neighborhood that includes the same pixel locations as the first interpolation region;
generating a second homogeneity array based on the second interpolation array that includes, at each pixel location in the portion, a homogeneity value calculated based on a second homogeneity neighborhood that includes the same pixel locations as the second interpolation region;
determining that, for a first pixel location in the portion, the homogeneity value in the first homogeneity array is greater than the homogeneity value in the second homogeneity array; and
outputting to a display or to a memory the RGB color values at the first pixel location in the first interpolation array.

17. The computer-readable medium of claim 16, wherein each of the first interpolation region and the second interpolation region is selected from a group of at least three different interpolation regions.

18. The computer-readable medium of claim 17, wherein each of the first interpolation region and the second interpolation region comprises one of a horizontal interpolation region, a vertical interpolation region, a first diagonal interpolation region, a second diagonal interpolation region, and a bilinear interpolation region.

19. The computer-readable medium of claim 16, further comprising:
converting each of the RGB color values included in the first interpolation array to another color space that includes a luminance value, a first chrominance value, and a second chrominance value; and
calculating, at each pixel location in the portion, a set of luminance distances, wherein each luminance distance indicates a difference between the luminance value at the pixel location and the luminance value at another pixel location in the first homogeneity neighborhood associated with the pixel location.

20. The computer-readable medium of claim 19, further comprising calculating, at each pixel location in the portion, a set of color distances, wherein each color distance indicates a difference between the chrominance values at the pixel location and the chrominance values at another pixel location in the first homogeneity neighborhood associated with the pixel location.

21. The computer-readable medium of claim 20, further comprising computing a luminance threshold based on the calculated luminance distances that indicates a similarity of luminance values at two different pixel locations within one of the homogeneity neighborhoods.

22. The computer-readable medium of claim 21, further comprising computing a color threshold based on the calculated color distances that indicates a similarity of chrominance values at two different pixel locations within one of the homogeneity neighborhoods.

23. The computer-readable medium of claim 22, wherein generating the first homogeneity array comprises, at each pixel location in the portion, determining a number of pixel locations within the first homogeneity neighborhood having a luminance distance below the luminance threshold and a color distance below the color threshold.

24. The computer-readable medium of claim 16, further comprising:
generating a third homogeneity array based on a third interpolation array that includes, at each pixel location in the portion, a homogeneity value calculated based on a third homogeneity neighborhood having the same pixel locations as a third interpolation region used to generate the third interpolation array;
generating a fourth homogeneity array based on a fourth interpolation array that includes, at each pixel location in the portion, a homogeneity value calculated based on a fourth homogeneity neighborhood having the same pixel locations as a fourth interpolation region used to generate the fourth interpolation array; and
generating a fifth homogeneity array based on a fifth interpolation array that includes, at each pixel location in the portion, a homogeneity value calculated based on a fifth homogeneity neighborhood having the same pixel locations as a fifth interpolation region used to generate the fifth interpolation array.

25. The computer-readable medium of claim 24, further comprising determining that, at the first pixel location, the homogeneity value in the first homogeneity array is greater than the homogeneity value in the third homogeneity array, the homogeneity value in the first homogeneity array is greater than the homogeneity value in the fourth homogeneity array, and the homogeneity value in the first homogeneity array is greater than the homogeneity value in the fifth homogeneity array.

26. The computer-readable medium of claim 16, further comprising generating a smoothed homogeneity array by applying a smoothing filter to the first homogeneity array, wherein the smoothed homogeneity array includes, at each pixel location in the portion, a smoothed homogeneity value.

27. The computer-readable medium of claim 26, further comprising generating a binary array based on the first interpolation array that includes, at each pixel location in the portion, a binary value indicating whether a red variance, a green variance, or a red variance is outside a particular threshold.

28. The computer-readable medium of claim 27, further comprising selecting, at each pixel location in the portion, either the homogeneity value from the homogeneity array corresponding to the pixel location or the smoothed homogeneity value from the smoothed homogeneity array corresponding to the pixel location based on the value in binary array at the pixel location.

29. The computer-readable medium of claim 16, wherein the portion is equivalent to the entire input image.

30. The computer-readable medium of claim 16, wherein each of the green color values in the first interpolation array that is interpolated is derived directly from the first interpolation region, and wherein each blue color value in the first interpolation array that is interpolated and each red color value in the first interpolation array that is interpolated is computed based on at least one of the green color values in the first interpolation array.

31. A system configured to generate an interpolated output image, the system comprising:
a memory; and
one or more processors coupled to the memory and configured to:
generate a first interpolation array for a portion of an input image based on a first interpolation region, wherein each pixel location in the portion includes a red color value, a green color value, or a blue color value, and the first interpolation array includes, at each pixel location in the portion, red, green, and blue (RGB) color values, at least one of which is interpolated,
generate a second interpolation array based on a second interpolation region and including, at each pixel location in the portion, RGB color values, at least one of which is interpolated,
generate a first homogeneity array based on the first interpolation array that includes, at each pixel location in the portion, a homogeneity value calculated based on a first homogeneity neighborhood that includes the same pixel locations as the first interpolation region,
generate a second homogeneity array based on the second interpolation array that includes, at each pixel location in the portion, a homogeneity value calculated based on a second homogeneity neighborhood that includes the same pixel locations as the second interpolation region,
determine that, for a first pixel location in the portion, the homogeneity value in the first homogeneity array is greater than the homogeneity value in the second homogeneity array, and
output to a display or to a memory the RGB color values at the first pixel location in the first interpolation array.

32. The system of claim 31, wherein each of the first interpolation region and the second interpolation region is selected from a group of at least three different interpolation regions.

33. The system of claim 32, wherein each of the first interpolation region and the second interpolation region comprises one of a horizontal interpolation region, a vertical interpolation region, a first diagonal interpolation region, a second diagonal interpolation region, and a bilinear interpolation region.

34. The system of claim 31, wherein the one or more processors are further configured to:
convert each of the RGB color values included in the first interpolation array to another color space that includes a luminance value, a first chrominance value, and a second chrominance value; and
calculate, at each pixel location in the portion, a set of luminance distances, wherein each luminance distance indicates a difference between the luminance value at the pixel location and the luminance value at another pixel location in the first homogeneity neighborhood associated with the pixel location.

35. The system of claim 34, wherein the one or more processors are further configured to calculate, at each pixel location in the portion, a set of color distances, wherein each color distance indicates a difference between the chrominance values at the pixel location and the chrominance values at another pixel location in the first homogeneity neighborhood associated with the pixel location.

36. The system of claim 35, wherein the one or more processors are further configured to compute a luminance threshold based on the calculated luminance distances that indicates a similarity of luminance values at two different pixel locations within one of the homogeneity neighborhoods.

37. The system of claim 36, wherein the one or more processors are further configured to compute a color threshold based on the calculated color distances that indicates a similarity of chrominance values at two different pixel locations within one of the homogeneity neighborhoods.

38. The system of claim 37, wherein generating the first homogeneity array comprises, at each pixel location in the portion, determining a number of pixel locations within the first homogeneity neighborhood having a luminance distance below the luminance threshold and a color distance below the color threshold.

39. The system of claim 31, wherein the one or more processors are further configured to:
generate a third homogeneity array based on a third interpolation array that includes, at each pixel location in the portion, a homogeneity value calculated based on a third homogeneity neighborhood having the same pixel locations as a third interpolation region used to generate the third interpolation array;
generate a fourth homogeneity array based on a fourth interpolation array that includes, at each pixel location in the portion, a homogeneity value calculated based on a fourth homogeneity neighborhood having the same pixel locations as a fourth interpolation region used to generate the fourth interpolation array; and
generate a fifth homogeneity array based on a fifth interpolation array that includes, at each pixel location in the portion, a homogeneity value calculated based on a fifth homogeneity neighborhood having the same pixel locations as a fifth interpolation region used to generate the fifth interpolation array.

40. The system of claim 39, wherein the one or more processors are further configured to determine that, at the first pixel location, the homogeneity value in the first homogeneity array is greater than the homogeneity value in the third homogeneity array, the homogeneity value in the first homogeneity array is greater than the homogeneity value in the fourth homogeneity array, and the homogeneity value in the first homogeneity array is greater than the homogeneity value in the fifth homogeneity array.

41. The system of claim 31, wherein the one or more processors are further configured to generate a smoothed homogeneity array by applying a smoothing filter to the first homogeneity array, wherein the smoothed homogeneity array includes, at each pixel location in the portion, a smoothed homogeneity value.

42. The system of claim 31, wherein the one or more processors are further configured to generate a binary array based on the first interpolation array that includes, at each pixel location in the portion, a binary value indicating whether a red variance, a green variance, or a red variance is outside a particular threshold.

43. The system of claim 42, where the one or more processors are further configured to select, at each pixel location in the portion, either the homogeneity value from the homogeneity array corresponding to the pixel location or the smoothed homogeneity value from the smoothed homogeneity array corresponding to the pixel location based on the value in binary array at the pixel location.

44. The system of claim 31, wherein the portion is equivalent to the entire input image.

45. The system of claim 31, wherein each of the green color values in the first interpolation array that is interpolated is derived directly from the first interpolation region, and wherein each blue color value in the first interpolation array that is interpolated and each red color value in the first interpolation array that is interpolated is computed based on at least one of the green color values in the first interpolation array.

\* \* \* \* \*